(12) United States Patent
Kimura et al.

(10) Patent No.: US 6,458,582 B1
(45) Date of Patent: Oct. 1, 2002

(54) REACTOR WITH FLAT PLATE COVER AND WOUND SHEET MATERIAL

(75) Inventors: Keisei Kimura, Bunkyo; Shinichi Fukuzono, Hitachinaka, both of (JP)

(73) Assignee: Hitachi, Ltd., Tokyo (JP)

( * ) Notice: Subject to any disclaimer, the term of this patent is extended or adjusted under 35 U.S.C. 154(b) by 17 days.

(21) Appl. No.: 09/677,603

(22) Filed: Oct. 3, 2000

(30) Foreign Application Priority Data

Oct. 5, 1999 (JP) .......................................... 11-283949

(51) Int. Cl.⁷ ................................................. C12M 1/38
(52) U.S. Cl. ............................... 435/286.2; 435/287.2; 435/287.3; 435/303.1; 435/305.3; 435/809; 422/102; 422/104; 219/428
(58) Field of Search .......................... 435/286.1, 288.2, 435/287.2, 287.3, 288.4, 303.1, 305.3, 305.4, 809; 422/102, 104; 220/211, 523, 526; 160/241; 219/428

(56) References Cited

U.S. PATENT DOCUMENTS

| | | | | |
|---|---|---|---|---|
| 2,771,399 A | * | 11/1956 | Savage ....................... 422/104 |
| 5,038,852 A | | 8/1991 | Johnson et al. |
| 5,056,427 A | * | 10/1991 | Sakabe et al. ............... 100/211 |
| 5,604,130 A | * | 2/1997 | Warner et al. ............... 220/523 |
| 5,851,492 A | * | 12/1998 | Blattner ....................... 220/232 |

FOREIGN PATENT DOCUMENTS

JP        7-5180        1/1995

* cited by examiner

*Primary Examiner*—William H. Beisner
(74) *Attorney, Agent, or Firm*—Mattingly, Stanger & Malur, P.C.

(57) ABSTRACT

When the reaction process is commences, the roller 12 is rotated at a specified number of revolutions so as to supply new sheet 11 between the heating plate 13 and the sheet retainer 15. Then, the fixing device 24 is lowered toward the heat cycler 24, the sheet 11 contacts the opening of the reaction container 23 arranged on the reaction container support block 22, and then the heating plate 13 pushes down the sheet 11 to let the sheet closely contact the opening of the reaction container 23. After the reaction of the reaction solution in the reaction container 23 is complete, the sheet retainer 15 retains the sheet 11, and then is lifted together with the fixing device 24 to separate the sheet 11 from the opening of the reaction container 23. Then, the roller 12 is rotated by a specified number of revolutions so that the used sheet 11 is taken up onto the roller 12 and new sheet 11 is supplied.

9 Claims, 11 Drawing Sheets

REACTOR WITH FLAT PLATE COVER AND WOUND SHEET MATERIAL

BACKGROUND OF THE INVENTION

The present invention relates to a reactor equipped with a cover that is generally used for a chemical reaction container, or preferably for a reaction container utilized with an apparatus in which contamination of specimen must be avoided.

Of late, a diagnosis of infectious disease, hereditary disease or cancer has become possible through gene analysis. In a gene analysis, where genes are extracted from a blood, sputum or tissue sample of a patient and a specific formation of the gene is detected, diagnosis is made in a relatively short time. The analysis requires a certain quantity of genes and, if few are available for the analysis, genes are reproduced in a large quantity so that the detection can be done.

Polymerase chain reaction (PCR) is the most popular method for reproduction of genes in a large quantity. An automated heat cycler designed for simultaneous PCR of a number of specimens is described in the U.S. Pat. No. 5,038,852. According to the patent, reaction containers are arranged typically 6 by 8 or 8 by 12.

These reaction containers are inserted into a metal block so that the bottom of each container thermally contacts the block evenly. Then, the temperature of the metal block is varied according to the specified temperature and duration of the PCR protocol.

In the first stage of the PCR, reaction solution is heated and maintained at about 95° C. In this process, the reaction container is covered with a cap to prevent evaporation of the reaction solution and then heated over the cap. The cap can be a separate individual cap or may be connected as a part to the reaction container.

The cap, which is, for example, of a dome shape on the top and a pipe shape on the bottom, is inserted into the reaction container so as to contact the inside closely to seal the container. The cap can be removed by pulling up one end of each cap strip.

Capping and uncapping are troublesome and time-taking task because they must be done very carefully so as to prevent contamination inside the reaction container or from a reaction container to another.

In conducting the PCR, capped reaction containers are inserted into the metal block and the heating plate is lowered onto the block. In this process, the heating plate pushes down the dome-shaped caps to let the caps be seated evenly onto all reaction containers and each reaction container thermally contact the metal block favorably. Then, in order to prevent condensation of the vapor inside reaction container or the caps, the heating plate is maintained at higher temperature than any other in the PCR protocol.

When the reaction solution is cooled down sufficiently after the PCR is complete, the capped reaction containers are taken out of the heat cycler. Then, the reaction containers are uncapped by pulling up each cap strip. The obtained PCR product, for example, in case of a gene analysis, is then handed over to the next process for detection.

Another example of a reaction container is described in the Japanese Patent Application Laid-Open No. 7-5180 (1995). A plane array of a reaction container cover is described in the Publication. According to the description, the cover is a flat sheet made of flexible plastic material that has multiple through holes and seals the reaction containers which are arranged vertically as specified between each through hole. This flat sheet is arranged so that the through holes are positioned between the upper surface of each reaction container.

As the heating plate is lowered onto the covers of the reaction containers, the heating plate pushes down the covers and the reaction containers. Thus, they can thermally contact the metal block favorably while the PCR is conducted.

Besides, as the through holes allow the air heated between the reaction containers to circulate downward onto the metal block, condensation of vapor inside each portion of the reaction container protruding from the metal block is prevented.

Needs for gene analysis as a primary screening means are increasing because diagnosis can be made in a relatively short time. Since a large number of specimens are to be processed continuously in the primary screening, it is preferred that a series of analytical processes are automated.

If the caps and cap strips according to the aforementioned prior art are employed, however, it is difficult to automate the insertion of the caps into the reaction containers and to process a large number of specimens simultaneously.

The flat sheet according to Japanese Patent Application Laid-Open No. 7-5180 (1995) is an effective means for processing a certain number of specimens simultaneously in case of an independent PCR in which continuous processing is not required.

However, it is very difficult to automate the process using the flat sheet according to the Japanese Patent Application Laid-Open No. 7-5180 (1995) because the sheet must be supplied and collected in each PCR processing.

The reaction containers can be uncovered easily by a single action after the PCR is complete and the heating plate is removed, but it is a batch processing for each reaction container, where continuous processing or automation is not considered, hence difficult to achieve.

SUMMARY OF THE INVENTION

An object of the present invention is to solve the problems in the prior art and realize a reactor in which a seal material can be attached/detached to the opening of a reaction container automatically and continuously.

In order to achieve the object, the present invention is constructed as follows:

(1) In a reactor that covers the opening of a reaction container, the reactor comprises a flat plate cover that is equipped with a roller No. 1 on which sheet material is wound and a roller No. 2 which takes up the sheet material from the roller No. 1; the opening of the reaction container is covered by the sheet material positioned between the rollers No. 1 and No. 2; and, after a specified time, the opening is uncovered as the sheet material is separated from the opening of the reaction container.

(2) Preferably, in a reactor according to (1) above, the reactor further comprises a motion control unit which controls to take up a specified length of the sheet material from the roller No. 1 onto the roller No. 2 in accordance with the specified reaction in the reaction container or the temperature control of the temperature control means so that new sheet material is arranged at a position covering the opening of the reaction container.

(3) Besides, preferably, in a reactor according to (1) or (2) above, the flat plate cover further comprises a temperature control means.

(4) Besides, preferably, in a reactor according to (1) or (2) above, the reactor further comprises a sheet retainer, or a sheet retainer of a lattice shape in particular, for retaining the sheet material positioned between the rollers No. 1 and No. 2 in case multiple reaction containers are arranged.

(5) Besides, preferably, in a reactor according to (1) or (2) above, the flat plate cover further comprises a heating plate which heats the reaction container via the sheet material, and the heating plate is provided with a protrusion which is inserted into the opening of the reaction container via the sheet material and seals the opening.

Because the used sheet is collected by the revolution of the roller and, at the same time, new sheet is supplied continuously, contamination from a container to another can be prevented.

Because the seal material for the reaction container can be supplied and collected continuously, the present invention is applicable to a chemical reactor, or preferably an automatic gene analyzer including a PCR apparatus.

DETAILED DESCRIPTION OF THE PREFERRED EMBODIMENT

Embodiments of the present invention are explained hereunder, using the drawings attached.

Figure 1:
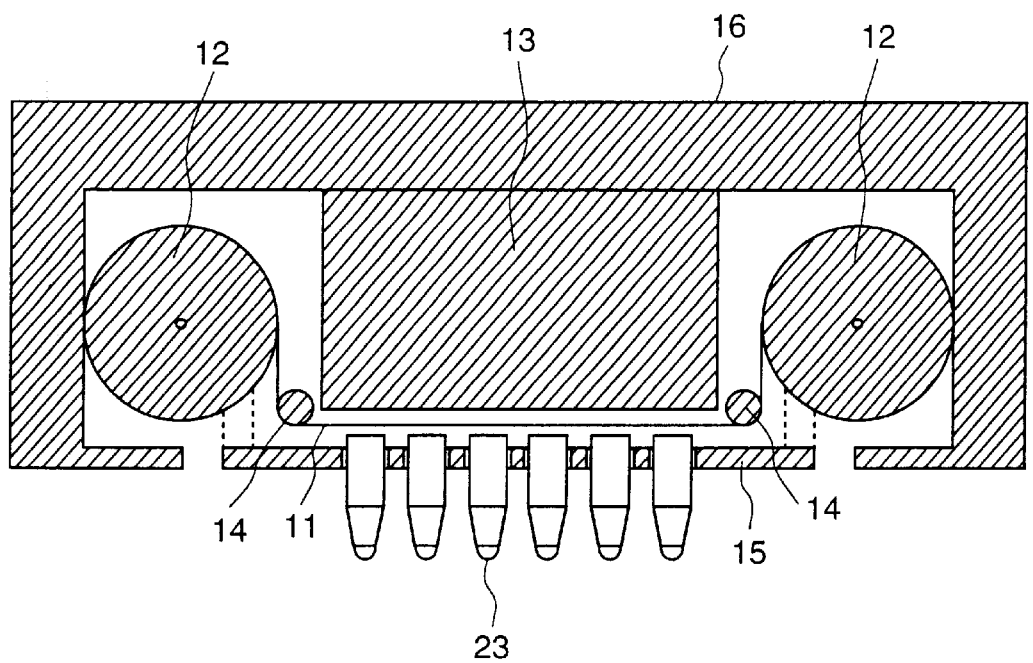
FIG. 1 is a brief cross sectional view of the fixing device of the reactor according to an embodiment of the invention.

FIG. 1 is a brief cross sectional view of a fixing device (flat plate cover) 24 of a reactor according to an embodiment of the present invention. In FIG. 1, the fixing device 24 comprises a sheet 11 (seal material) which seals the opening of a reaction container 23, a roller 12 on which the sheet 11 is wound, and a heating plate 13 which pushes down the sheet 11 so as to let the sheet 11 closely contact the opening of the reaction container 23 and also heats the air between the sheet 11 and the reaction container 23 so as to prevent condensation of vapor inside the reaction container 23 and on the sheet 11.

The fixing device 24 further comprises a sheet catch 14 which guides the sheet 11 under the heating plate 13, a sheet retainer 15 which retains the sheet 11 while the sheet 11 is separated from the opening of the reaction container 23, and a cabinet 16.

The sheet 11 is a sheet which seals multiple reaction containers 23 very favorably, is inactive with reaction reagent, and will not stick to the reaction container 23 or heating plate 13 even if heated.

The roller 12 consists of two rollers, one on which the sheet 12 is wound and the other which takes up the sheet 11, mounted in opposition to each other from the heating plate 13. Upon an instruction from a control unit (not shown), the roller 12 is rotated by a specified number of revolutions to supply or collect the sheet 11.

The heating plate 13 according to an embodiment of the present invention is fixed inside the fixing device 24, and presses the sheet 11 onto the opening of the reaction container 23 as the fixing device 24 is lowered. Otherwise, it is possible that the heating plate 13 is not fixed but designed to be able to move inside the fixing device 24 and that the fixing device 24 is not lowered but instead the heating plate 13 is lowered so as to press the sheet 11 onto the opening of the reaction container 23.

Figure 2:
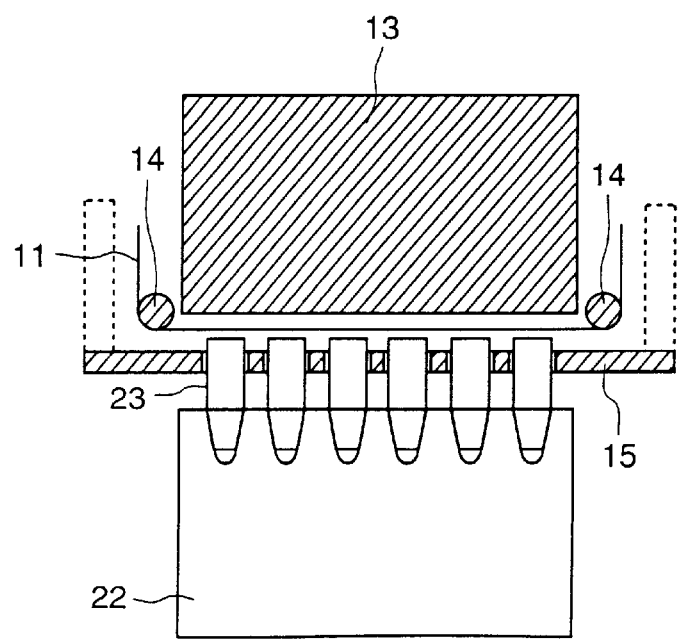
FIG. 2 is a partial cross sectional view of the sheet in the fixing device shown in FIG. 1.

FIG. 2 is a partial cross sectional view around the sheet 11 in the fixing device 24.

In FIG. 2, the heating plate 13 is located above the reaction container support block 22 and provided with convex protrusions on its surface so that the protrusions are inserted partly into and contacted closely with the opening of the reaction containers 23 via the sheet 11. Then, the heating plate 13 heats the air between the sheet 11 and the reaction containers 23 so as to prevent condensation of vapor inside the reaction containers 23 and on the sheet 11.

The sheet catch 14, which is located each on the right and left side (both sides) of the heating plate 13, guides the sheet 11 from the roller 12, located each on the right and left side (both sides) of the fixing device 24, under the heating plate 13 (between the heating plate 13 and the sheet retainer 15). The sheet retainer 15, which is positioned so as to sandwich the sheet 11 with the sheet catch 14, that is, in opposition from the sheet 11 to the sheet catch 14, retains the sheet 11 while the sheet 11 is separated from the reaction container 23 so as to prevent looseness.

Figure 3:
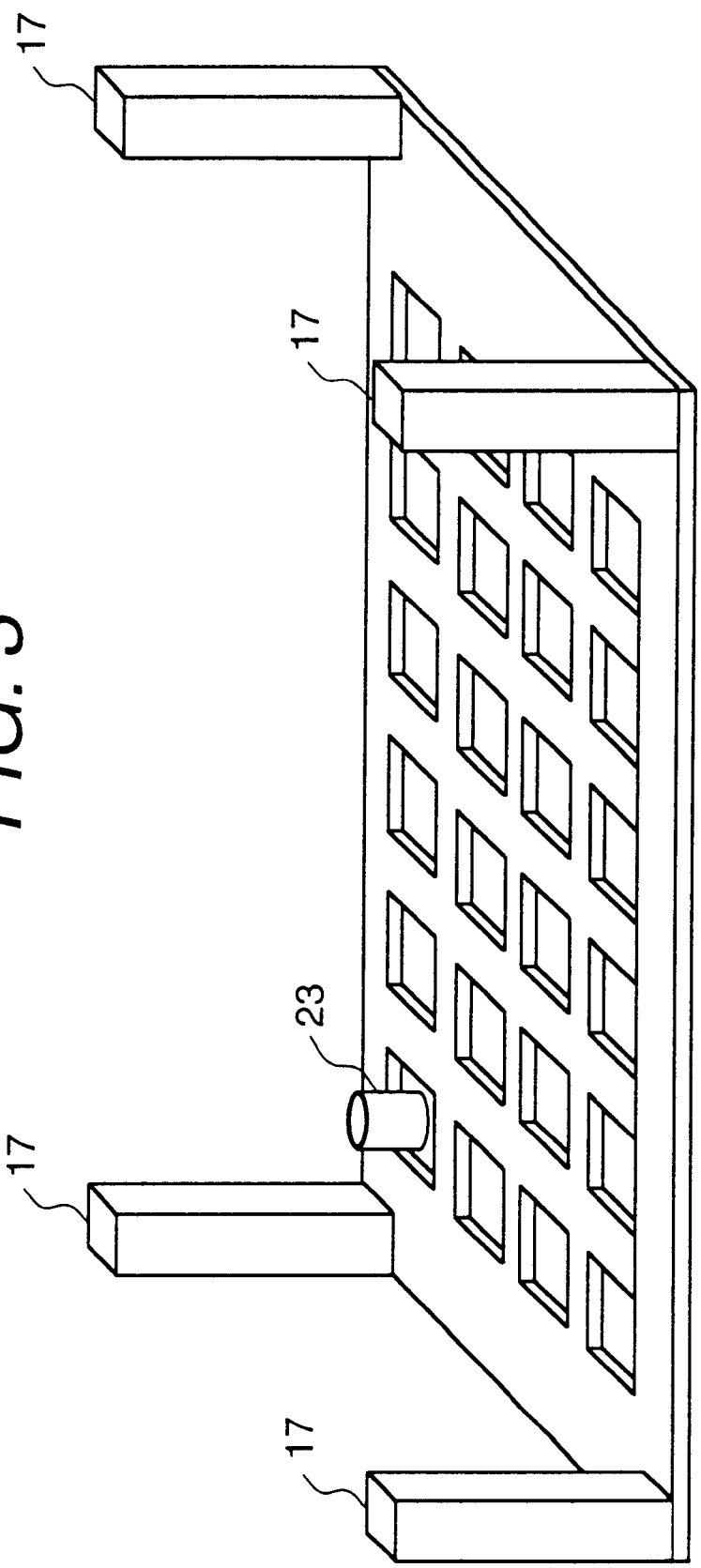
FIG. 3 is a brief schematic diagram of the sheet retainer according to an embodiment of the invention.

FIG. 3 is a brief schematic diagram of the sheet retainer 15 according to an embodiment of the present invention.

In FIG. 3, the sheet retainer 14 is of a lattice shape and the reaction container 23 contacts the sheet 11 through the lattices of the sheet retainer 15.

Although one each reaction container is arranged between each lattice in this embodiment, it is possible that multiple reaction containers 23 are arranged between each lattice. The sheet retainer 15 can be moved up and down by a drive mechanism mounted in the cabinet 16 via the support columns 17 on the four corners.

The reactor equipped with the fixing device 24 according to an embodiment of the present invention is explained hereunder.

Figure 4:
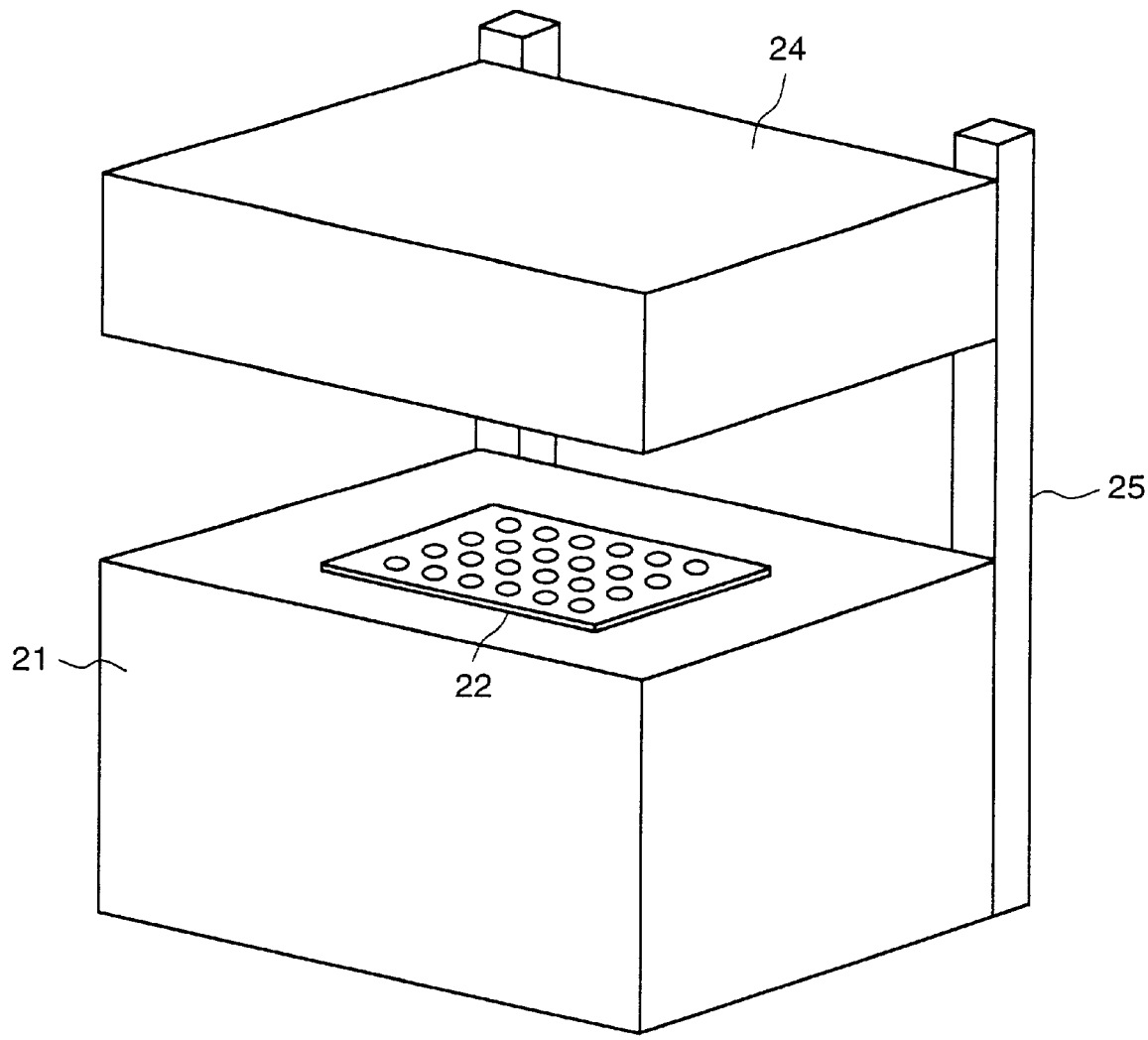
FIG. 4 is an outline of an example reactor according to the invention.
Figure 5:
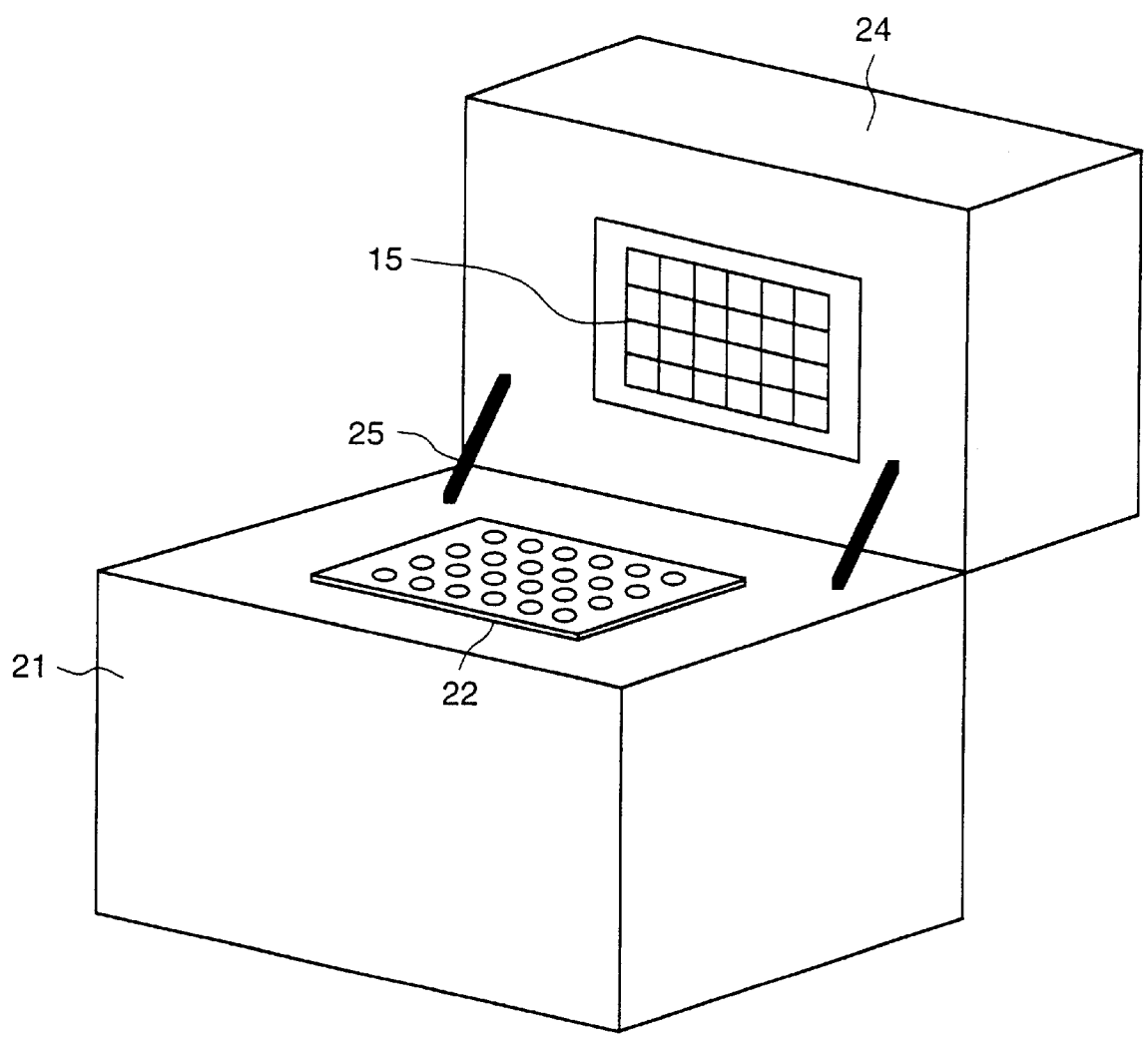
FIG. 5 is an outline of another example reactor according to the invention.

Each FIG. 4 and FIG. 5 shows an example outline and another outline of the reactor according to the present invention. The reactor comprises a heat cycler 21 which controls the temperature and duration of the reaction solution (equipped with a temperature controller for controlling the temperature of the reaction solution in the reaction container 23), a reaction container support block which can be mounted/dismounted on the heat cycler 21 and on which multiple reaction containers 23 are arranged*reaction containers 23 each of which has an opening on the top, a fixing device 24 which puts/separates the sheet 11 onto/from the openings of the reaction containers 23, and support columns 25 which support the fixing device 24.

The heat cycler 21 preferably comprises a set-up section on which the temperature, duration and control parameters are set, a drive mechanism which drives the fixing device 24 and a roller 12, and a control unit which controls the whole system.

Besides, the heat cycler 21 controls the temperature of the reaction solution as it repeats heating and cooling in accordance with the temperature and duration set on the set-up section. Each reaction container 23 has an opening on its top and the openings of multiple reaction containers 23 are to be arranged flush when they are arranged on the reaction container support block 22.

The fixing device 24 of the reactor shown in FIG. 4 is located above the reaction container support block 22, keeping its position in parallel to the upper surface of the reaction container support block 22. Besides, the fixing device 24 is lowered to press the sheet 11 from above and let the sheet 11 closely contact the opening of the reaction container 23 and also lifted to separate the sheet 11 from the opening of the reaction container 23.

The support columns 25, which support the fixing device 24, move the fixing device 24 up and down by the drive mechanism so as to put/separate the sheet 11 onto/from the openings of the reaction containers. A detector for detecting the position of the fixing device 24 is mounted on the support column 25.

Besides, the fixing device 24 in the reactor shown in Fig. 5 is arranged so as to rotate around a common axis which comprises of an edge of the fixing device 24 surface on the heat cycler 21 side and an edge of the heat cycler 21 surface on the fixing device 24 side, and the rotating angle is controlled by the support columns 25. Thus, in a similar manner as explained above, the sheet 11 can be put/separated onto/from the openings of the reaction containers 23.

The motion of the fixing device 24, including the motion for covering the openings of the reaction containers 23, is described hereunder. FIG. 6 to FIG. 12 show typical motions of the fixing device 24.

Figure 6:
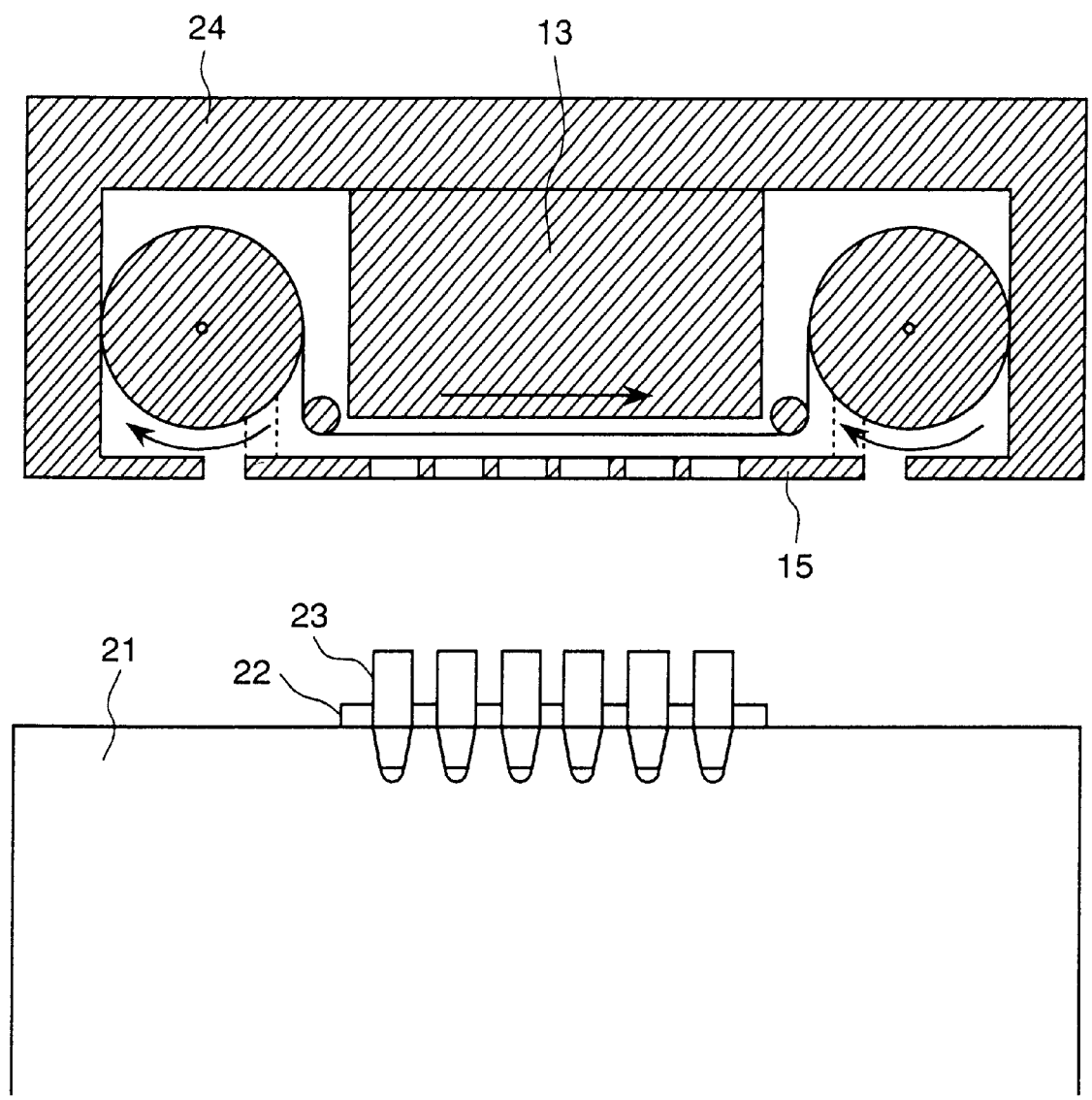
FIG. 6 is an explanatory figure showing that the roller is rotated and the sheet is supplied.
Figure 7:
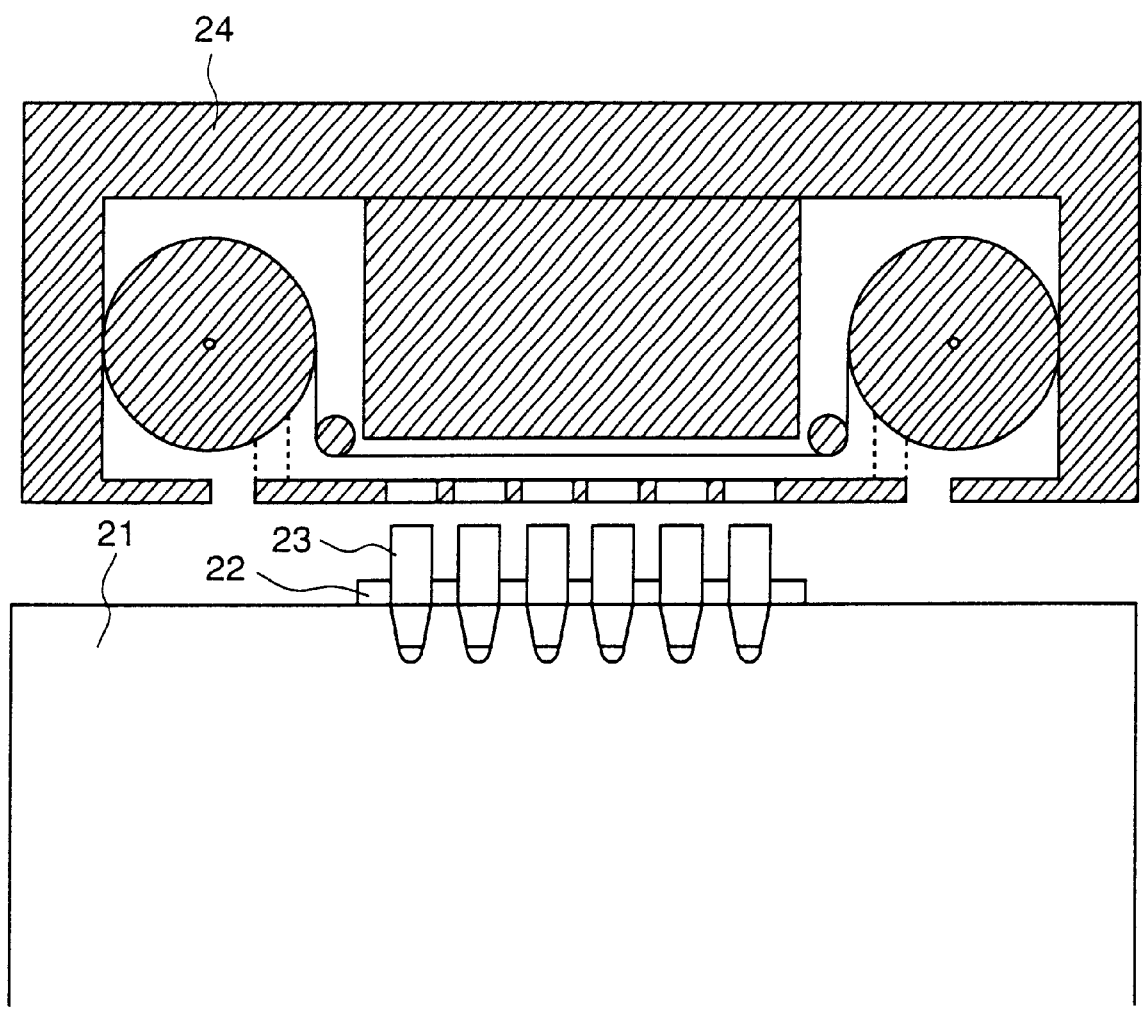
FIG. 7 is an explanatory figure showing that the fixing device is lowered.
Figure 8:
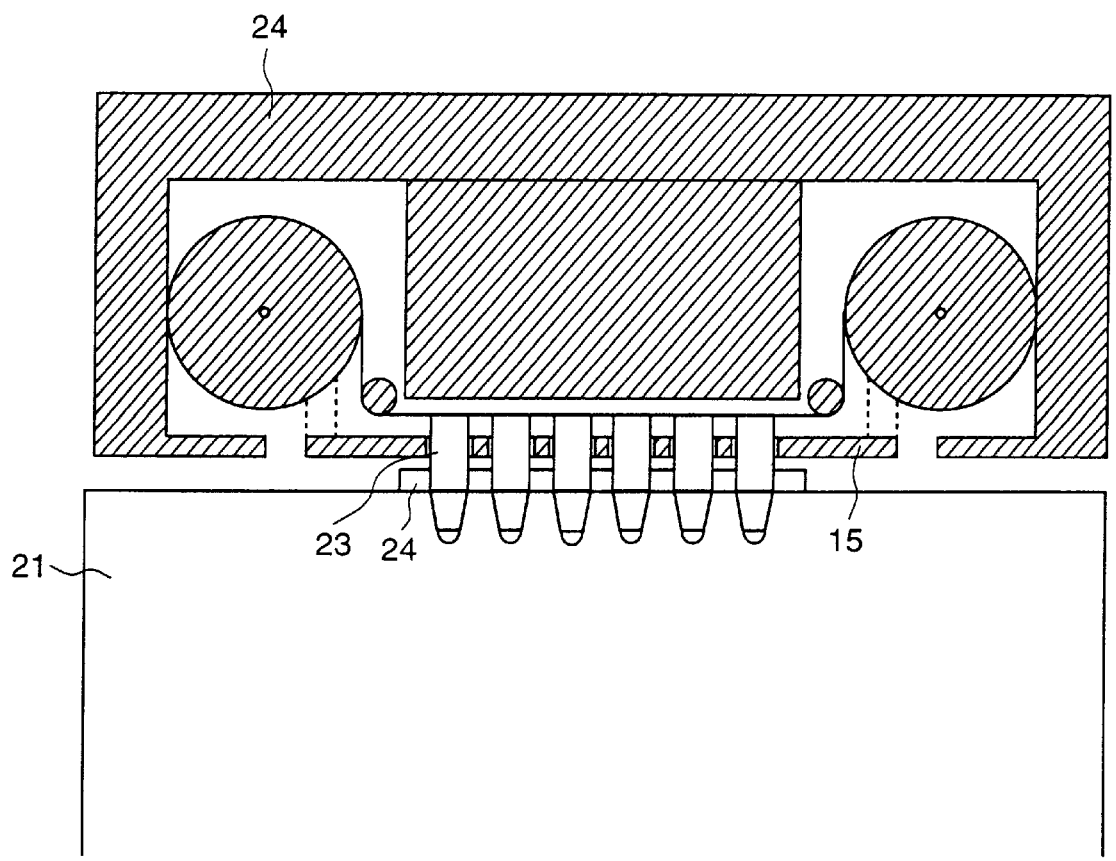
FIG. 8 is explanatory figure showing that the sheet contacts the opening of the reaction container.

In FIG. 6, when the reaction process is commenced, the roller 12 is rotated by a specified number of revolutions by an instruction from the control unit so as to supply new sheet 11 between the heating plate 13 and the sheet retainer 15. Then, the drive mechanism mounted on the support columns 25 which support the fixing device 24 is actuated and the fixing device 24 is lowered toward the heat cycler 21 (FIG. 7).

Figure 9:
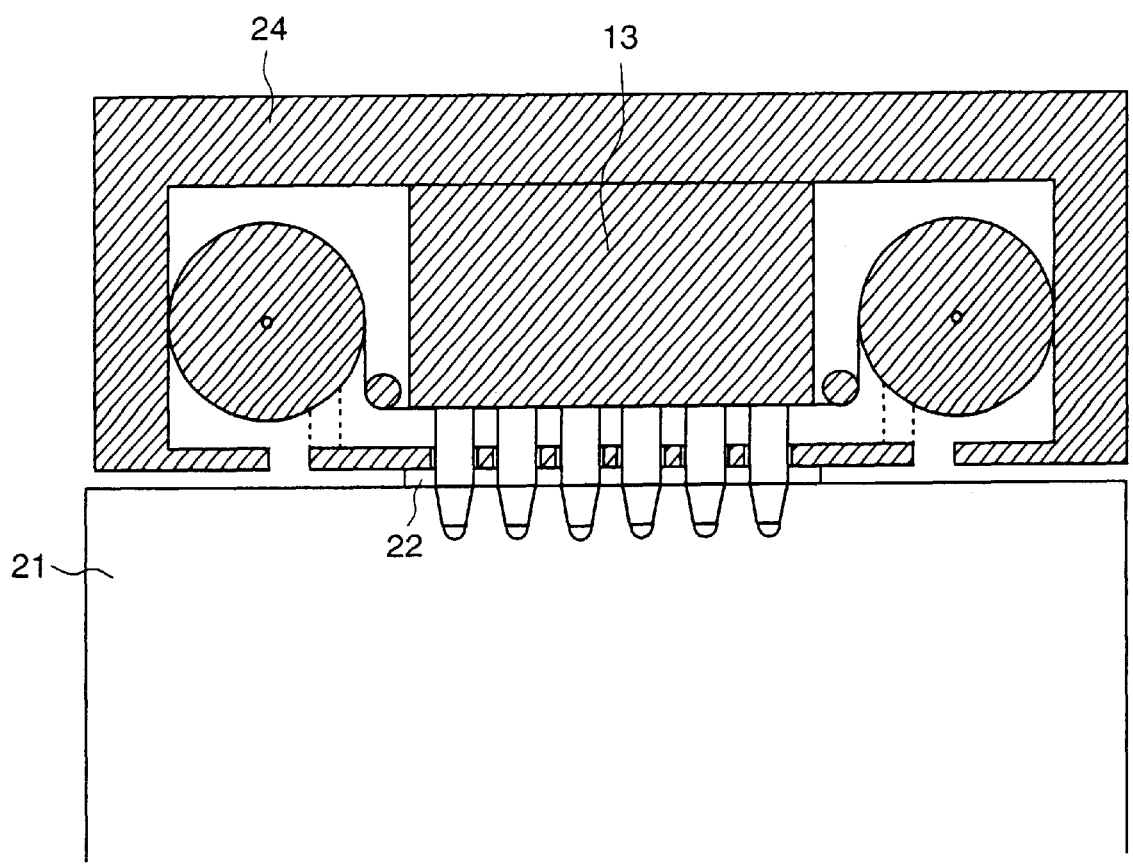
FIG. 9 is explanatory figure showing that the heating plate lets the sheet closely contact the opening of the reaction container.
Figure 10:
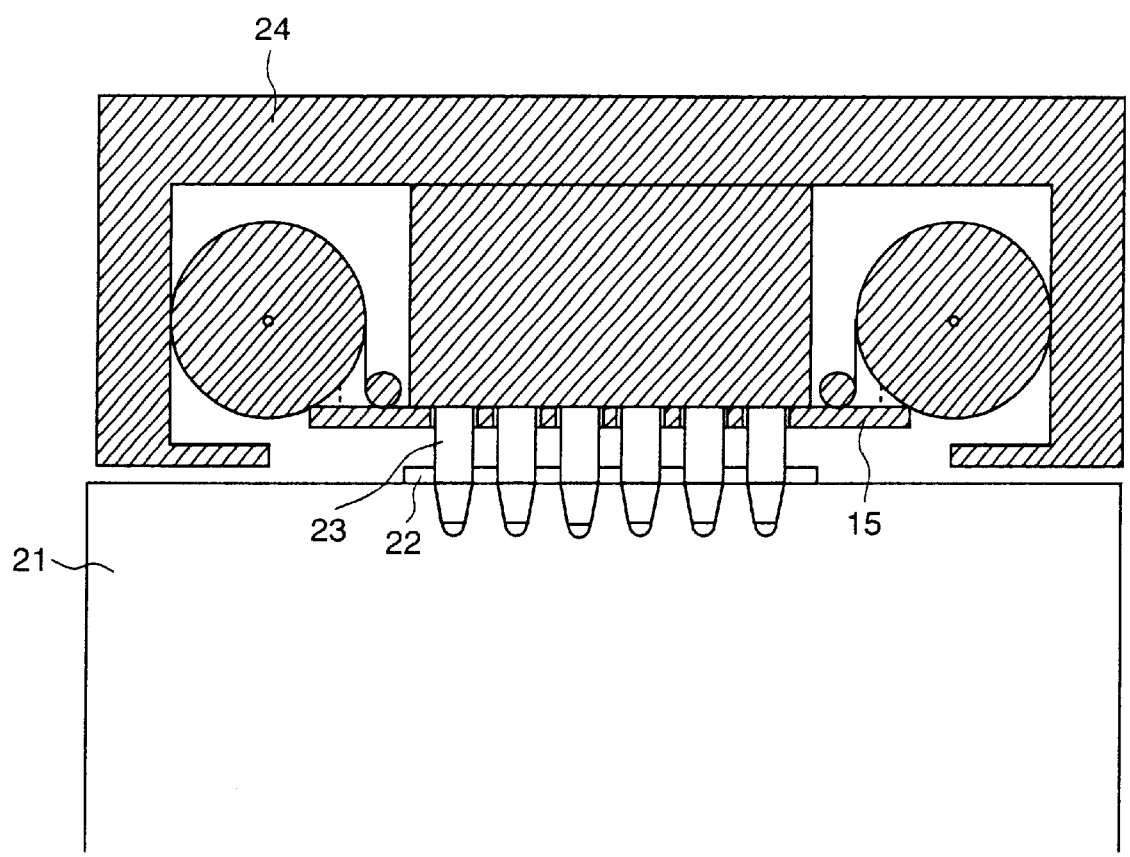
FIG. 10 is an explanatory figure showing that the sheet retainer retains the sheet.

As the fixing device 24 is lowered toward the heat cycler 21, the sheet 11 contacts the openings of the reaction containers 23 arranged on the reaction container support block 22 (FIG. 8), and then the heating plate 13 further presses the sheet 11 to let it closely contact the openings of the reaction containers 23 (FIG. 9). The position of the fixing device 24 in a lowering motion is detected by the detector, and the lowering motion of the fixing device 24 is stopped by an instruction from the control unit.

Figure 11:
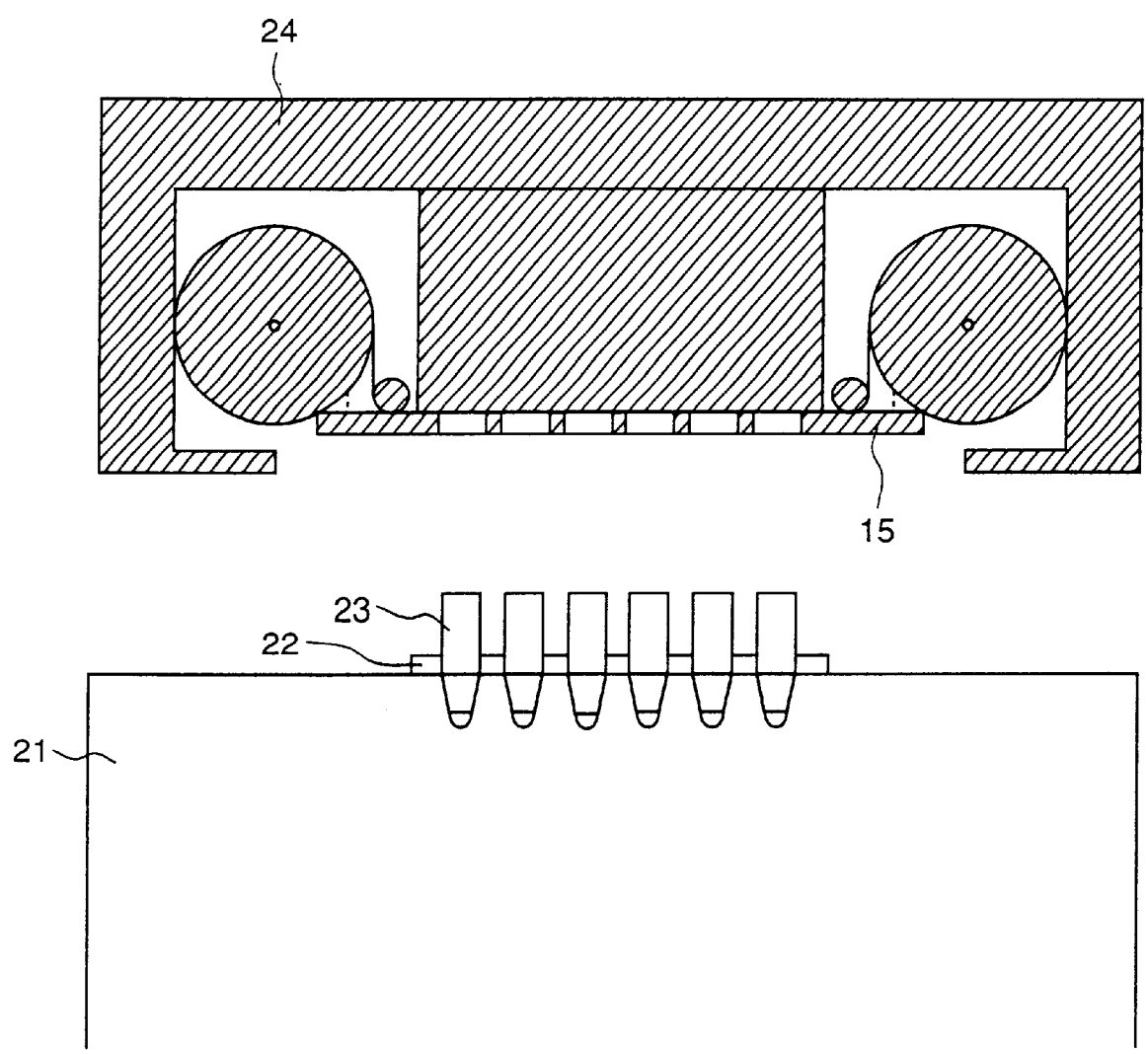
FIG. 11 is an explanatory figure showing that the fixing device is lifted and the sheet is separated from the opening of the reaction container.

After the reaction process is complete, the sheet retainer 15 retains the sheet 11 by an instruction from the control unit (FIG. 10), and then is lifted up together with the fixing device 24 and separates the sheet 11 from the openings of the reaction containers 23 (FIG. 11). With this motion, the openings of the reaction containers 23 are uncovered. The position of the fixing device 24 in a lifting motion is detected by the detector, and the lifting motion of the fixing device 24 is stopped by an instruction from the control unit and the sheet retainer 15 releases the sheet 11.

Figure 12:
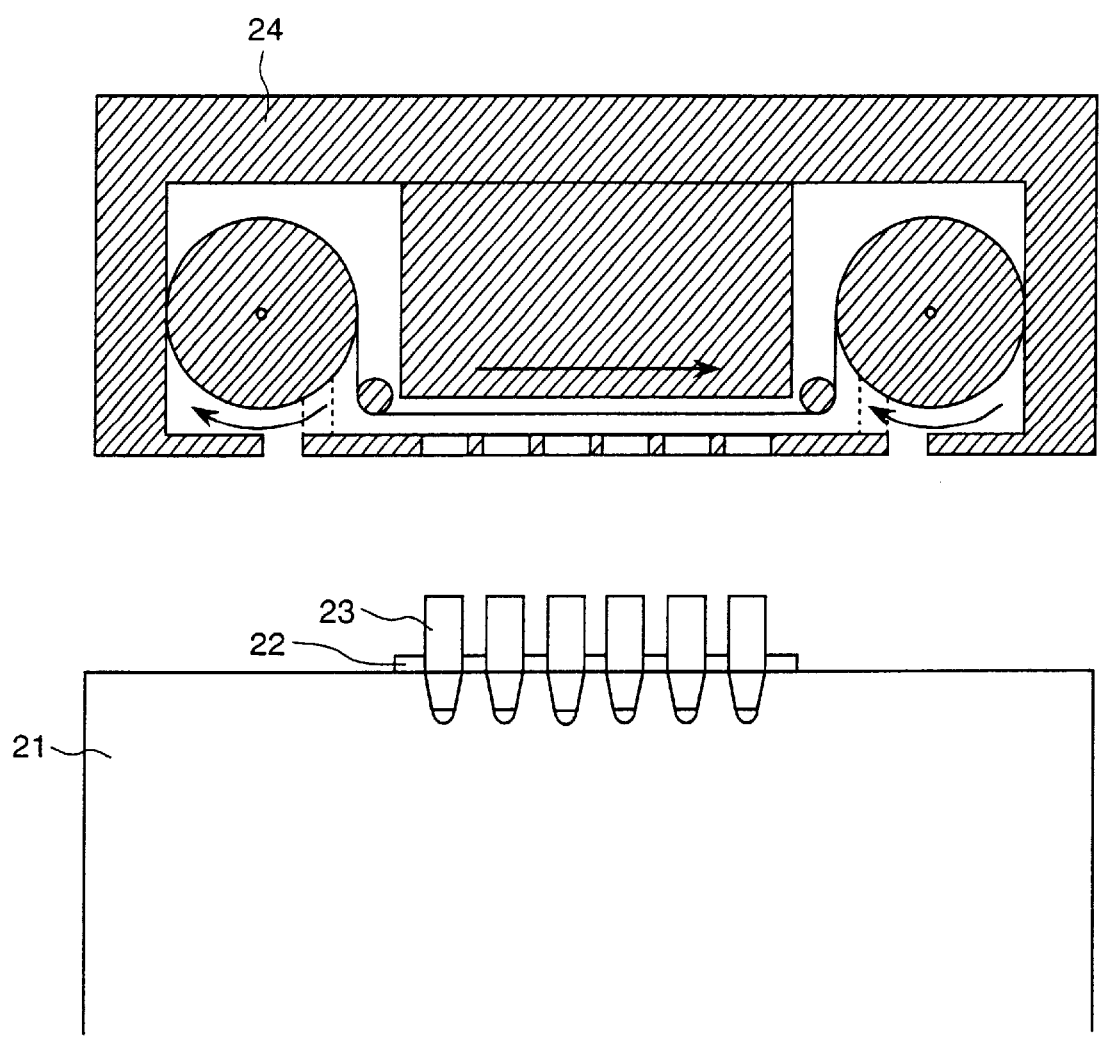
FIG. 12 is explanatory figure showing that the roller is rotated and the used sheet is collected.

Next, the roller 12 is rotated by a specified number of revolutions by an instruction from the control unit so as to take up and collect the used sheet 11 and, at the same time, supply new sheet 11 (FIG. 12).

Reaction procedure of a reactor of the above construction is described hereunder, taking the PCR as a concrete example.

The operator mixes a specimen containing genes to be reproduced with a reaction reagent including primer, and injects them dividedly into each reaction container 23. Preferably, the specimen solution containing genes to be reproduced is injected dividedly into each reaction container 23 arranged on the reaction container support block 22 by an automatic machine, and then a reaction reagent including primer is also injected dividedly and mixed together.

Next, the operator sets the specified temperature, duration, and number of cycles of reaction on the set-up section of the heat cycler 21. When the reaction process is started by the operator, the roller 21 is rotated by a specified number of revolutions upon an instruction from the control unit and new sheet 11 is supplied. Then, the fixing device 24 is lowered so as to let the sheet 11 closely contact the openings of the reaction containers 23. The position of the fixing device 24 is detected by the detector mounted on the support column 25, and the lowering motion of the fixing device 24 is stopped by an instruction from the control unit.

The PCR is conducted as the reaction container support block 22 is heated and cooled by the heat cycler 21. In order to prevent condensation of vapor inside the reaction container 23, the sheet 11 is heated to a specified temperature. After the PCR is complete, the sheet retainer 15 retains the sheet 11 and is lifted together with the fixing device 24, and then the sheet 11 is separated.

The position of the fixing device 24 is detected by the detector mounted on the support column 25, and the lifting motion of the fixing device 24 is stopped by an instruction from the control unit, and then the sheet retainer 15 releases the sheet 11. Then, the operator takes out the PCR product from the reaction container 23 and hand over to the next process.

As explained above, according to an embodiment of the present invention, the sheet 11 for covering the openings of the reaction containers 23 are supplied between the heating plate 13 and the sheet retainer 15 automatically by the roller 12, and then, as the heating plate 13 is moved closer to the multiple reaction containers 23 that are inserted into the sheet retainer 15, the sheet 11 closely contacts and seals the openings of the multiple reaction containers 23. Then, after a heating process of the reaction solution (specimen) in the reaction containers 23, as the heating plate 13 is moved apart from the sheet retainer 15, the sheet 11 is separated from the reaction containers 23.

Consequently, it becomes possible to realize a reactor with which the seal material can be put/separated onto/from the openings of the reaction containers automatically and continuously. Besides, since the sheet 11 and the opening of the reaction container 23 are heated by the heating plate 13, condensation of vapor inside the reaction container 23 can be prevented.

In the embodiments, for example, in case of a PCR process in the gene analysis, wherein the reaction solution is heated and maintained at about 95° C., the sheet 11 is employed to prevent evaporation of the reaction solution. For this reason, material of the sheet 11 is desired to be heat resistant and hydrophobic; for example, silicone rubber, polypropylene or polyvinylidene chloride is preferred.

The simplest control method of the roll for taking up the sheet 11 is to rotate the roller by a specified number of revolutions so as to collect the used sheet 11 and, at the same time, supply new sheet 11.

This method is to rotate the roller 12 always at a certain number of revolutions to take up the sheet 11 irrespective of the amount of the sheet 11 wound on the roller. More preferable method is to control the number of revolutions according to the amount of sheet wound on the roller so that a constant length of the sheet 11 is always taken up.

In the above method, the roller 12 on which the sheet 11 is wound may be rotated in a passive manner, but it is preferred to provide with a mechanism that is interlocked with the No. 2 roller 12 and gives a constant tension to the sheet 11 or to control the revolution of the No. 1 roller 12.

The reaction container support block 22, corresponding particularly to a micro plate or continuous tube, for example, where multiple reaction containers are arranged in matrix, is to support the openings of the containers flush. Material of the reaction container 23 is not restricted at all provided that it has superior thermal conductivity, but metal is preferable from a viewpoint of ease for machining and economy.

According to the present invention, because a reactor is so constructed that the sheet which covers the openings of the reaction containers are supplied automatically, that the openings of multiple reaction containers are sealed and covered by this sheet, and that, after a heating process of the reaction agent in the reaction containers is complete, the sheet is separated from the reaction containers automatically, a reactor with which the seal material is put/separated onto/from the openings of the reaction containers has been realized.

Accordingly, the operator can be released from covering and uncovering task of the containers and a chemical reaction, preferably the PCR process, can be operated continuously.

By applying the present invention, it is possible to design a piece of automatic processing equipment, including a chemical reactor, or preferably a PCR apparatus, which is capable of conducting a series of processes for a gene analysis automatically.

What is claimed is:

1. A reactor for covering the opening of a reaction container comprising a support block for supporting at least one reaction container; a fixing device housing a first roller and a second roller; sheet material wound on the first roller and taken up on the second roller such that the sheet material extending between the rollers is exposed on the bottom of the fixing device, the fixing device movably supported over the support block such that the opening of the reaction container is sealed by the sheet material in a first position of the fixing device and after a specified reaction is complete, the opening of the reaction container is uncovered as the sheet material is separated from the opening of the reaction container in a second position of the fixing device.

2. A reactor according to claim 1, wherein the reactor further comprises a motion control unit which controls to take up a specific length of the sheet material from the first roller onto the second roller in accordance with the specified reaction in the reaction container so that new sheet material is arranged at a position covering the opening of the reaction container.

3. A reaction according to claim 1, wherein the fixing device further comprises a temperature control means.

4. A reactor according to claim 1, wherein the reactor further comprises a sheet retainer for retaining the sheet material positioned between the first and second rollers when covering plural reaction containers.

5. A reactor according to claim 1, wherein the fixing device further comprises a heating plate which heats the reaction container via the sheet material, and the heating plate is provided with a protrusion which is inserted into the opening of the reaction container via the sheet material and seals the opening.

6. A reactor for covering the opening of a reaction container comprising a support block for supporting at least one reaction container, a heating plate located above said support block, and sheet material wound on a first roller and taken up on a second roller, said heating plate being movably supported over the support block such that the opening of the reaction container is sealed by the sheet material in a first position of the heating plate and after a specified reaction is completed, the opening of the reaction container is uncovered as the sheet material is separated from the opening of the reaction container in a second position of said heating plate.

7. A reactor according to claim 6, wherein the reactor further comprises a motion control unit which controls to take up a specific length of the sheet material from the first roller onto the second roller in accordance with the specified reaction in the reaction container so that new sheet material is arranged at a position covering the opening of the reaction container.

8. A reaction according to claim 6, further comprising a temperature control means.

9. A reactor according to claim 6, wherein the reactor further comprises a sheet retainer for retaining the sheet material positioned between the first and second rollers when covering plural reaction containers.

* * * * *